June 25, 1935.  C. SMITH  2,005,807

STOCK QUOTATION POSTING AND MARGIN CALCULATING MACHINE

Filed Aug. 30, 1930  9 Sheets-Sheet 1

INVENTOR
CLYDE SMITH

R. C. Hopgood
ATTORNEY

June 25, 1935.  C. SMITH  2,005,807
STOCK QUOTATION POSTING AND MARGIN CALCULATING MACHINE
Filed Aug. 30, 1930  9 Sheets-Sheet 2

INVENTOR
CLYDE SMITH
BY R. C. Hopgood
ATTORNEY

June 25, 1935.　　　　　C. SMITH　　　　　2,005,807
STOCK QUOTATION POSTING AND MARGIN CALCULATING MACHINE
Filed Aug. 30, 1930　　　9 Sheets-Sheet 4

INVENTOR
CLYDE SMITH
BY R. C. Hopgood
ATTORNEY

June 25, 1935.   C. SMITH   2,005,807
STOCK QUOTATION POSTING AND MARGIN CALCULATING MACHINE
Filed Aug. 30, 1930   9 Sheets-Sheet 5

FIG. 4

INVENTOR
CLYDE SMITH
BY
ATTORNEY

June 25, 1935.  C. SMITH  2,005,807

STOCK QUOTATION POSTING AND MARGIN CALCULATING MACHINE

Filed Aug. 30, 1930  9 Sheets-Sheet 6

INVENTOR
CLYDE SMITH
BY R. C. Hopgood
ATTORNEY

FIG. 6

June 25, 1935.  C. SMITH  2,005,807
STOCK QUOTATION POSTING AND MARGIN CALCULATING MACHINE
Filed Aug. 30, 1930  9 Sheets-Sheet 8

INVENTOR
CLYDE SMITH
BY
ATTORNEY

June 25, 1935.  C. SMITH  2,005,807

STOCK QUOTATION POSTING AND MARGIN CALCULATING MACHINE

Filed Aug. 30, 1930  9 Sheets-Sheet 9

INVENTOR
CLYDE SMITH
BY R. C. Hopgood
ATTORNEY

Patented June 25, 1935

2,005,807

UNITED STATES PATENT OFFICE 2,005,807

STOCK QUOTATION POSTING AND MARGIN CALCULATING MACHINE

Clyde Smith, Hopkinsville, Ky., assignor to International Communications Laboratories, Inc., New York, N. Y., a corporation of New York Application August 30, 1930, Serial No. 478,881

18 Claims. (Cl. 235—92)

The present invention relates to a quotation posting and margin calculating machine for displaying stock and commodity prices and for calculating and posting, in accordance with the change in such prices, the remaining equity of a number of traders having varying commitments, on margin, of such stocks or commodities.

The invention herein described makes it possible to compute simultaneously the equities of all traders dealing in a particular stock or commodity and to display the results of such computations, together with the price on which they were based, on suitable dials or registers. Thus, as the various stock or commodity prices rise and fall, running balances of all accounts may be kept and the last price considered in the computation of the last balances registered with those balances. Also a signal is provided which gives a visible indication when any balance has fallen below an amount previously determined and set.

Thus, an object of the invention is to register prices of a number of stocks and commodities on a quotation board for ready reference.

Another object of the invention is to provide a system for automatically computing and registering the balances remaining in the accounts of various traders after a number of changes in the prices of the stocks or commodities forming items of such traders' accounts; the balances being computed in accordance with the traders' commitments whether long or short, and with the price changes whether up or down. A price change in a given stock affects all traders in that stock at the same time.

A further object of the invention is to provide an automatic signal to give a warning when any account has been depleted to a point regarded as unsafe, the warning mechanism having been previously set to operate at the predetermined limit.

Again, an object of the invention resides in the method of supplying at all times a visual indication of the commitments of all traders. This makes the total amount of any stock or commodity carried on the books of a brokerage firm readily ascertainable, thus lessening the danger of carrying unwarrantedly large blocks of any one stock or commodity.

Briefly, the invention comprises a plurality of price indicating dial groups or price registers, a plurality of credit balance or money registers, a commodity selector, a price selector, a plurality of traders' commitment jacks, and circuits and apparatus selectable by the positioning of the wipers of the price and commodity selectors, together with the insertions of plugs in the commitment jacks, to connect certain money registers to a system of shafting, to determine the amount of rotation of such shafting and to determine the proportion of such total amount of rotation during which each money register shall remain connected to the shafting. Also there are a number of control and auxiliary circuits, the use of which will appear in the following description.

Commodity selector

Figures 1, 5:
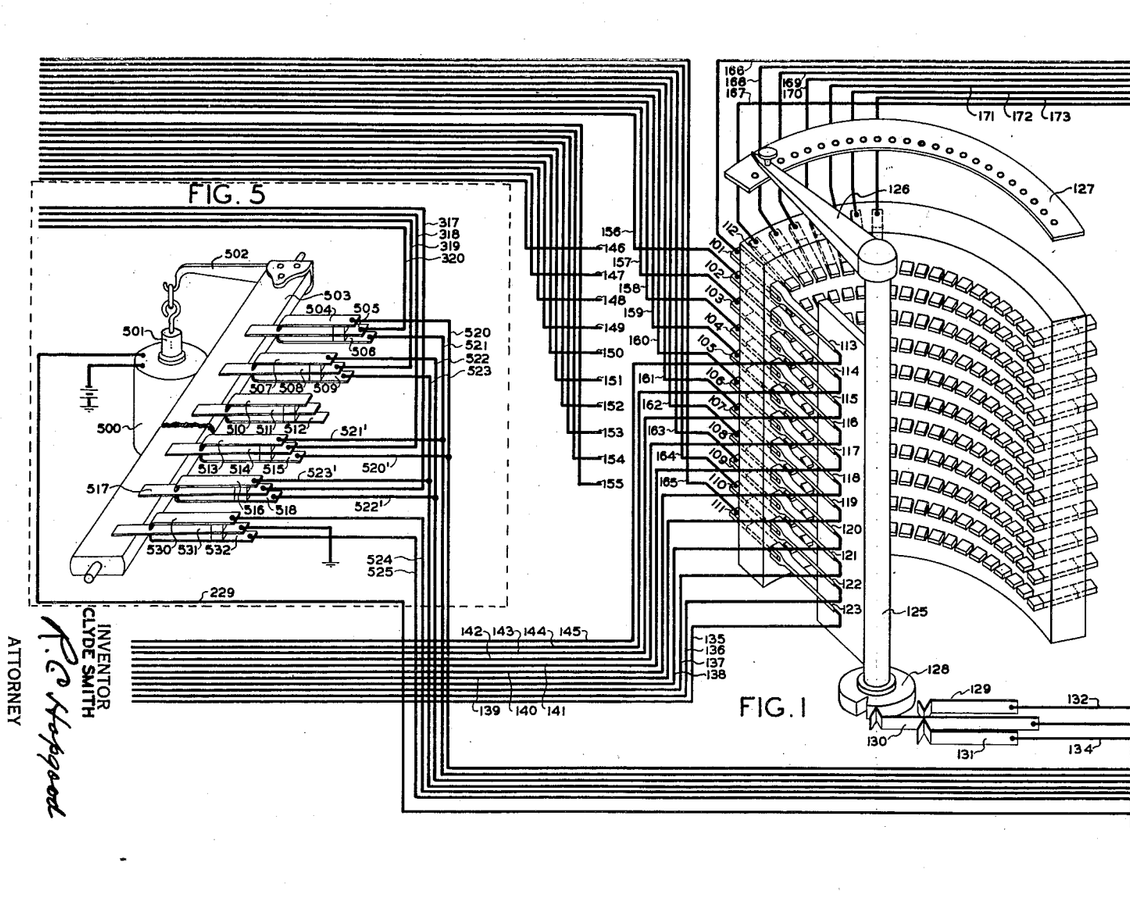
Figure 1 is a perspective of the commodity selector.
Fig. 5 is a perspective of a portion of the circuit changer.

The commodity selector is a manually operated, multi-contact, rotary switch. This commodity selector consists of a group of contacts arranged in a series of vertical rows, each row being composed of eleven contacts, as 101—111, suitably mounted in a semi-cylindrical support; a shaft 125 carrying a series of eleven wipers 113—123, each wiper being adapted to make connection with any contact on its horizontal level (or row); an index arm 126, rigidly connected to the shaft; and a stationary index plate 127 carrying designations for each stock and commodity. These parts are so arranged that when the index arm is placed over a stock designation on the index plate, the wipers contact with respective ones of a vertical row of contacts associated with the designated stock or commodity. For example, when the index arm is in the position shown, the wipers contact with respective ones of a row of contacts associated with commodity A, as will be more fully described hereinafter.

Figure 6:
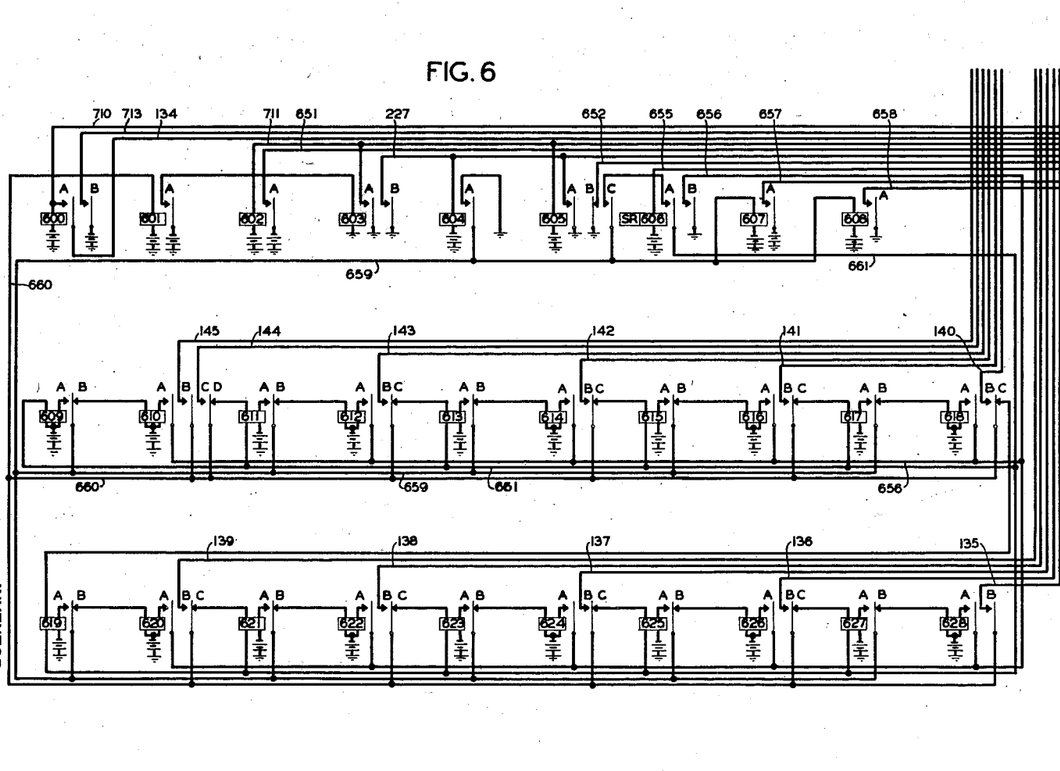
Fig. 6 is a diagram of the wiring of the control relays.

The wipers of the commodity selector are common to all stocks and commodities and are connected to the control relays of Fig. 6. The top contact as 101, 112 of each vertical row is wired to one of the price registers of Figs. 9 and 10, while the remaining contacts of the vertical rows are connected to the traders' commitment jacks in a manner which will be described when those jacks are considered.

Also shown in Fig. 1 is a control cam 128 rigidly fixed to the shaft 125. This cam controls the position of the tongue 130 of the contact set 129, 130, 131 and through these contacts establishes circuits to advise the operator of the position of the price and commodity selectors.

Price selector

Figures 2, 7:
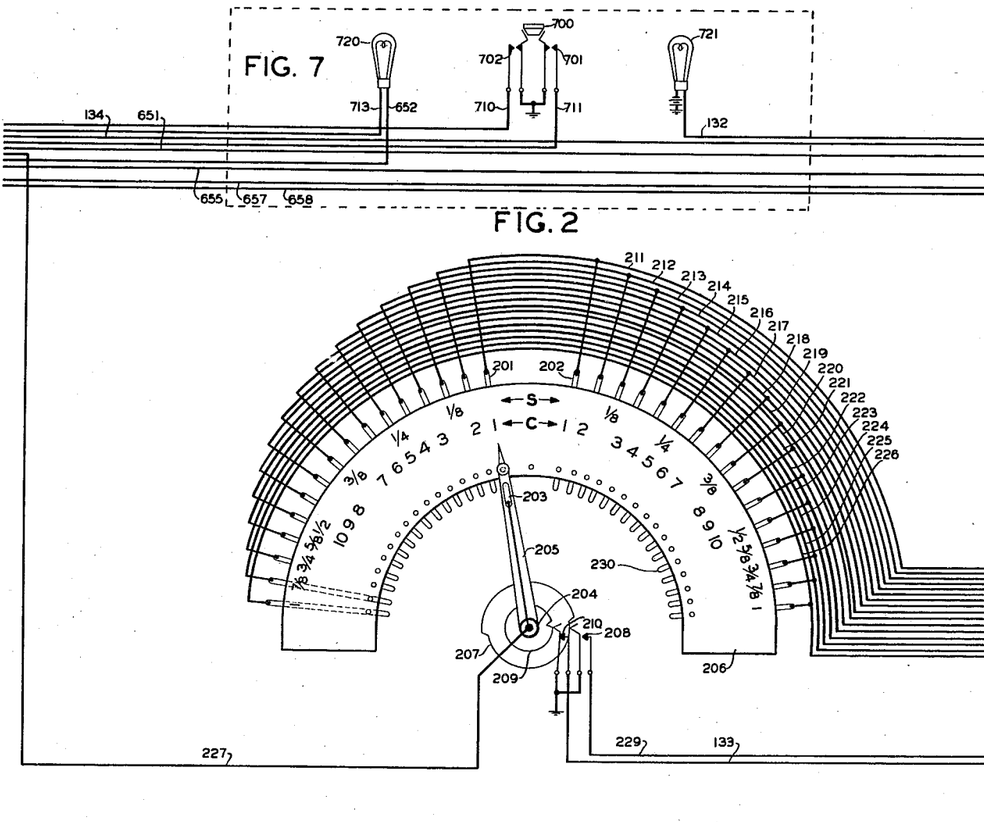
Fig. 2 is a plan of the price selector.
Fig. 7 shows the initiating button and the supervisory lamps.

Fig. 2 shows the price changing selector by means of which a price change of the selected commodity is effected. The price changing selector consists of a series of contacts as 201, 202 arranged in a semi-circle at spaced distances and adapted to be contacted by wiper 203 fixed to move with a shaft 204; shaft 204 also carries the index arm 205 which is set to a desired position by use of the price calibrated index plate 206.

Also attached to the shaft 204 are two cams 207 and 209; cam 207 closes contact 208 when arm 205 is moved to the right, thus operating the circuit changer of Fig. 5 for a purpose subsequently set forth; while cam 209 closes contact 210 whenever arm 205 is moved from the zero or normal position, this closing of contact 210 completing an indicating lamp circuit subsequently described.

Arm 205 may be rotated either clockwise or counter clockwise; clockwise rotation corresponds to a decrease and counter clockwise rotation to an increase in price. Contacts in symmetrical positions on opposite sides of the zero or normal position of arm 205, as contacts 201 and 202, are connected in multiple and are wired to associated price changing wheel control magnets 426 (Fig. 4), as is more fully hereinafter set forth. In order to establish a price changing circuit the index arm 205 is moved only the amount representative of the difference between the price at which the commodity stood after the last price change and the present price and in a direction corresponding to the sign of that difference.

Commitment jack unit

Figure 3:
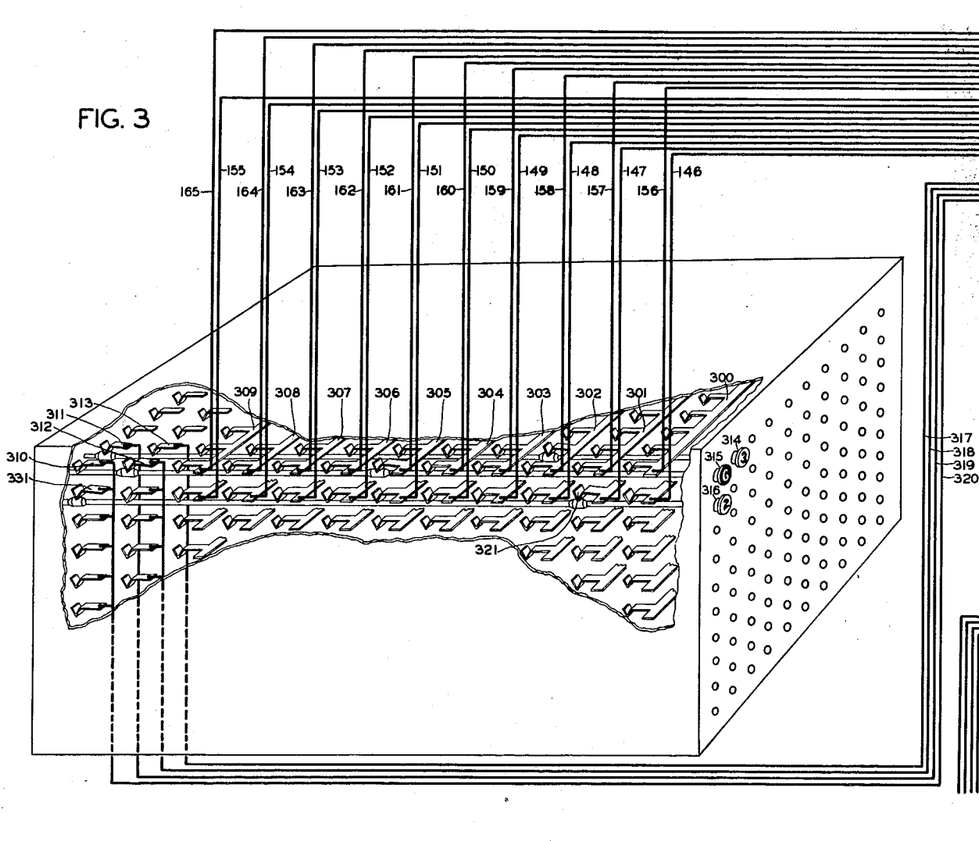
Fig. 3 is a perspective of the commitment jack unit broken away to show the schematic arrangement of the contacts.

Fig. 3 and the associated detail drawings (Figs. 3A—3F) show one of the traders' commitment jack units capable of handling the accounts of ten traders dealing in ten different stocks or commodities. In practice the system may be extended to include as many units as may be necessary. In these figures like parts are designated by like numerals.

Figure 8:
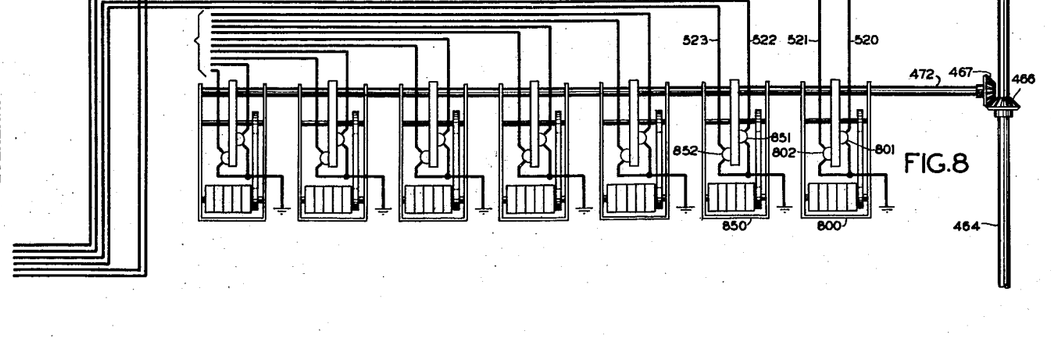
Fig. 8 is a fragmentary view of the traders' credit balance or money registers showing their arrangement on a common drive shaft.

The commitment jacks are used to establish circuits from the commodity selector of Fig. 1 to the money registers, as 800, of Fig. 8 in accordance with the amount (in units of trading) and character (long or short) of the traders' commitments. These jacks are so arranged that a visual indication is given of the character and amount of each trader's commitment.

Each jack unit contains one hundred contact strips such as 300 (Figs. 3 and 3A), each strip including ten contacts mechanically and electrically connected. These contact strips are arranged in ten horizontal levels, each level containing ten strips (Figs. 3.) Each horizontal level is associated with a certain commodity while each strip of contacts in that level represents a multiple of the trading unit of that commodity. Thus, the entire upper horizontal level composed of strips 300—309 represents commodity A, while contact strip 300 represents one unit of trading in commodity A, contact strip 301 represents two units of trading in commodity A, etc.

Figures 3A, 3B, 3C, 3D, 3E, 3F:
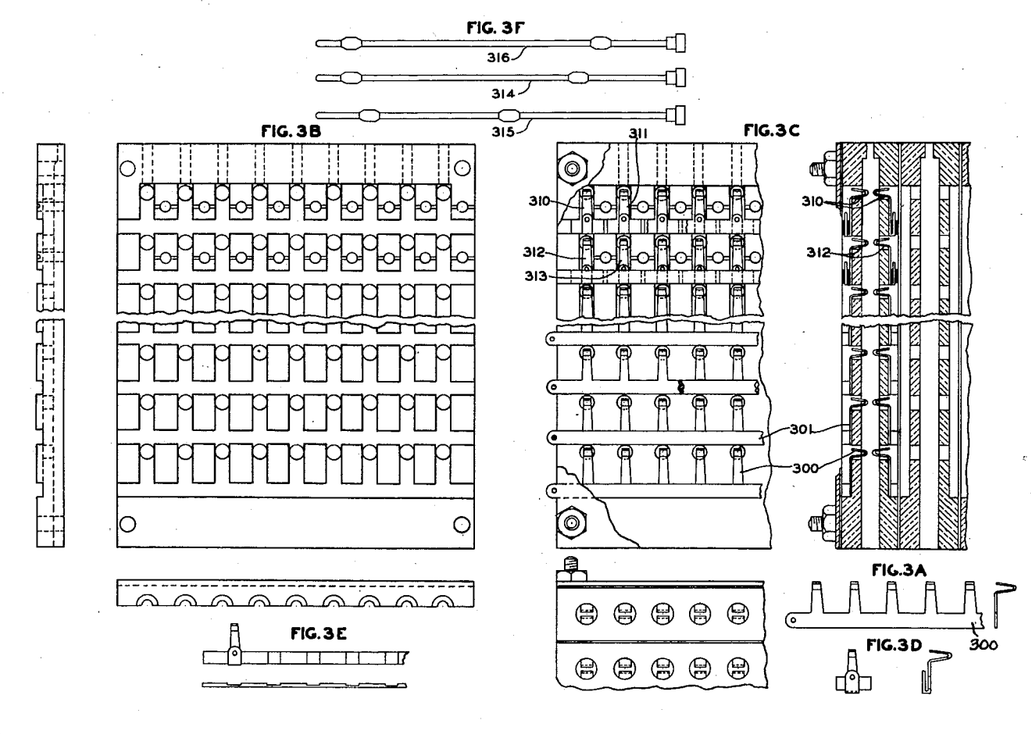
Fig. 3A comprises a plan and side elevation of a contact strip as used in the commitment jack unit.
Fig. 3B comprises plan, front and side elevations of a contact mounting block as used in the commitment jack unit.
Fig. 3C comprises a plan of a fragmentary portion of the commodity jack unit as well as two broken sectional views of that fragmentary portion.
Fig. 3D is a plan and side elevation of single contacts used in the commitment jack unit.
Fig. 3E is a plan and side elevation of an insulating strip used to mount the single contacts of Fig. 3D. One of these is shown mounted on the insulating strip.
Fig. 3F shows three plugs used in the jack unit.

The contact arrangement as described above provides a system for selecting a commodity and the number of trading units of the commodity to which a trader is committed, but does not take into account the character of that commitment. In order to alter the circuit condition to suit the character of the commitment, contacts as shown in Fig. 3D are provided and mounted as shown in Figs. 3 and 3C. Contacts as 310 and 311 (Fig. 3) are associated with long commitments while contacts as 312 and 313 are associated with short commitments.

Fig. 3, as was indicated, is a schematic diagram of the jack unit while Figs. 3A—3F show structural details of the jack unit and associated plugs. Fig. 3A shows a contact strip in both plan and elevation. Fig. 3B shows the insulating separations which form mountings for the contact strips of Fig. 3A and for contacts as shown in Fig. 3D. Fig. 3C shows sectional views of an organization of contacts and insulators, as well as a broken front view of one of the jack units. It is to be noted that the actual assembly as shown here differs slightly from the schematic view of Fig. 3 in that all contacts are in duplicate thus making possible a two point contact with the plug rather than the single contact possible with the arrangement shown in Fig. 3. Fig. 3D shows top and side views of an individual contact of the type used for setting up the long and short commitment circuits.

Fig. 3E shows the contact binders which are used to keep the contacts of Fig. 3D in position between the insulating separators shown in Fig.

3B. Fig. 3F shows certain of the plugs used to complete circuits through the commitment jacks. The plugs are of the same types as those shown inserted in the jack unit of Fig. 3 and are here represented again merely to illustrate the relation of the positioning of the contact studs. Plug 314 is arranged with contact studs for setting up a circuit representative of a long commitment of three trading units, plug 315 is for setting up a circuit representative of a short commitment of six trading units, and plug 316 is for setting up a circuit representative of a long commitment of two trading units. In order to make the plugs readily distinguishable, those for long commitments have white and those for short commitments have red tips. The value, in trading units, represented by each plug is stamped upon the tip. A glance at the commitment jacks and plugs is thus sufficient to inform the observer of the nature and amount of all traders' commitments.

*Price changing wheel unit*

Figure 4:
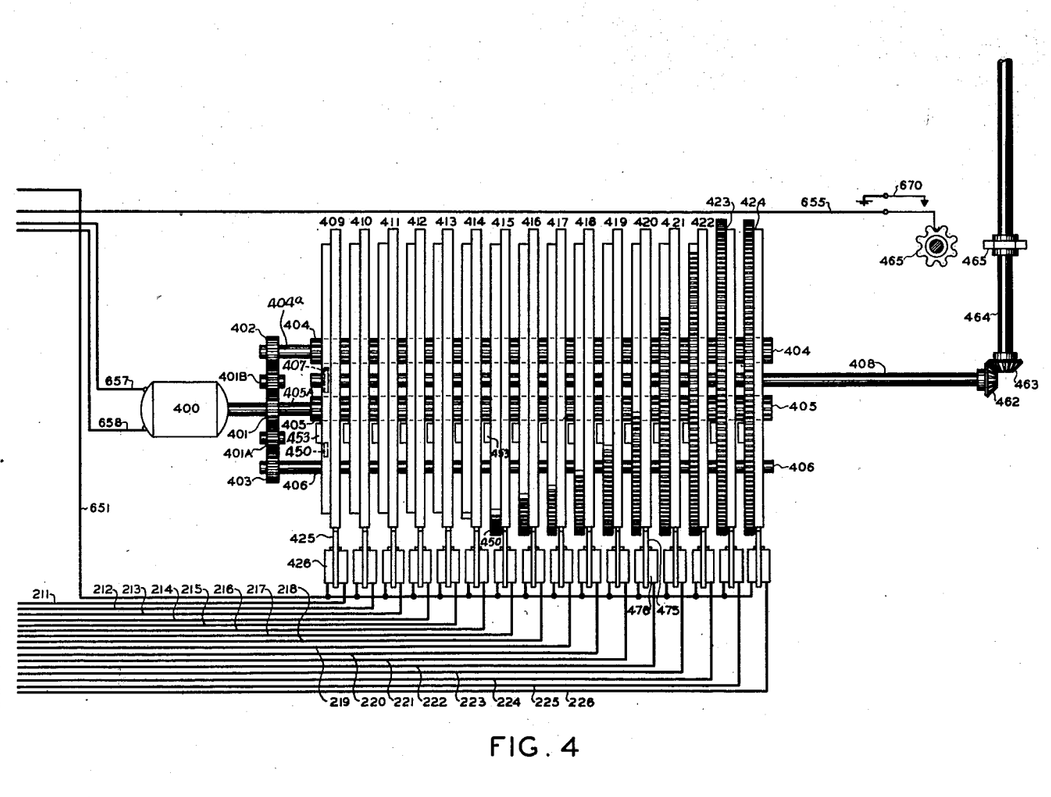
Fig. 4 is a plan of the driving motor and price changing wheel unit.

Fig. 4 and the associated detail drawings Figs. 4A—4D show the electrically controlled mechanical equipment for driving the money registers 800 (Fig. 8) and price registers 900 (Fig. 9) definite and predetermined amounts in accordance with a price change and the amount of the trader's commitments.

The driving apparatus for this equipment includes a motor 400 (Fig. 4), driving gear 401, idler gears 401A and 401B, driven gears 402 and 403, price changing wheel driving pinions 404 and 405, return shaft 406, driven pinions as 407 (Fig. 4A) and selectable price changing wheels 409—424.

In Fig. 4 sixteen selectable price changing gear wheels 409—424 are shown, corresponding to the sixteen price divisions of the price selector of Fig. 2. It is to be understood that both the price selector and price changing wheel unit may be enlarged to care for a more extended range of price changes or a more extended list of commodities, or both.

Figure 4A:
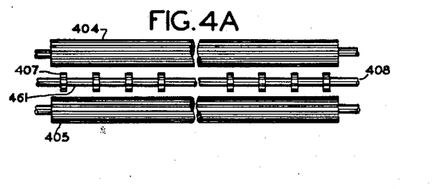
Fig. 4A is a plan of the price changing wheel, driving and driven pinions, showing their relation to one another.
Figure 4B:
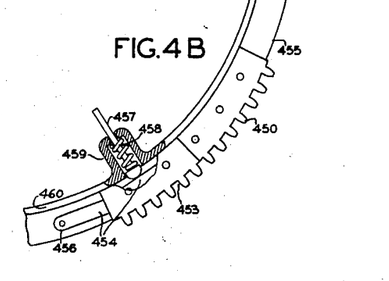
Fig. 4B is a detailed view of a portion of the price changing wheel shown in Fig. 4C.
Figure 4C:
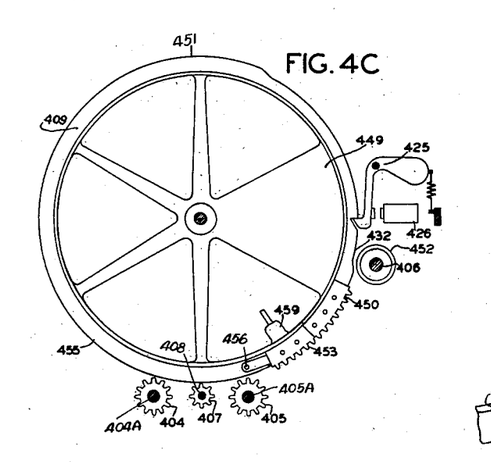
Fig. 4C is a side elevation of one of the price changing wheels together with the driving and driven pinions.
Figure 4D:
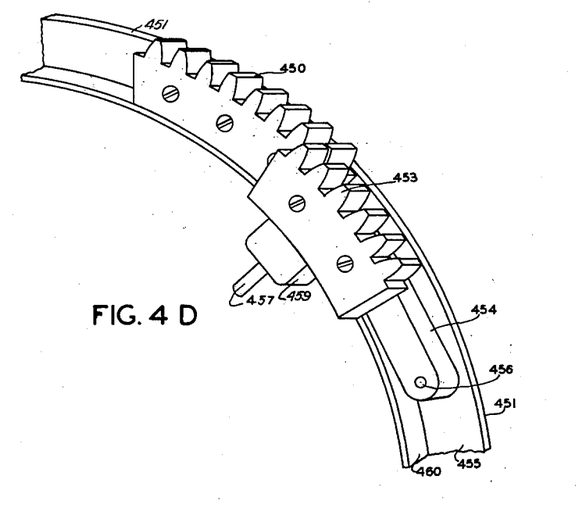
Fig. 4D is a perspective of a portion of the price changing wheel of Fig. 4C.

The construction of the selectable gear wheels is shown in Fig. 4C which is a side view of wheel 409 adapted to care for a one point price change in cotton. Wheel 409 carries a driving gear segment 450 having eight driving teeth (as shown in Fig. 4D). Other wheels as 410—424 are similar in construction except that the number of teeth of the driving segments varies as shown on wheels 415—424 (Fig. 4). Wheel 410 is for a two point price change in cotton and has a driving segment of sixteen teeth; wheel 411 is for a one-eighth point price change in stock and carries a driving gear segment of twenty teeth. The reason for this difference in the number of teeth on the cotton and on the stock price changing wheels will be explained hereinafter. Other cotton price changing wheels are employed for effecting other cotton price changes, and other stock price changing wheels are employed for effecting other stock price changes. These wheels for the several commodities have driving gear segments with a number of teeth proportional to the price change to be effected in the particular commodity.

The arrangement of the pinions 407 with reference to the pinions 404 and 405 may be seen by reference to Figs. 4, 4A and 4C. The pinions 404 and 405 are elongated pinions or roller gears, as may be seen from Fig. 4A. The pinion 404 is mounted on a shaft 404A one end of which is journalled in gear 402 (Fig. 4) and the other end journalled in a fixed support (not shown). The pinion 405 is mounted on a shaft 405A having one end journalled in the gear 403 (Fig. 4) and the other end likewise journalled in a fixed support (not shown). The pinions 407 are mounted on a shaft 408 having one end journalled in the wheel 409 and the other terminating in a bevel gear 462 co-operating with a bevel gear 463 on shaft 464. The shaft 408 is disposed between the shafts 404A and 405A and the pinions 407 are mounted at intervals along the shaft in such a manner as to co-operate at certain times with the driving segment 450 of the associated price changing wheel.

All the gear wheels as 409 are normally held out of mesh with the driven pinion 407 and driving pinions 404 and 405 by latches as 425 (Figs. 4 and 4C) controlled by magnets as 426. Now, using wheel 409 as an example, a brief description of the construction of the price changing wheels will be given. Selective driving gear wheel 409 includes a rim 455 from which flange 460 extends axially (Fig. 4D). Seated against the inner portion of flange 460 and rigidly fixed to rim 455 is driving gear segment 450 (Figs. 4C and 4D). Also mounted on rim 455 is pin 456 upon which arm 454 carrying starting gear segment 453 is pivoted. Arm 454 is held away from flange 460 by the plunger 457 pushed radially outward against arm 454 by spring 458 which is confined in housing 459 integral with flange 460 (Figs. 4B and 4D).

Arranged to make frictional contact with the peripheral portion 451 of rim 455 is roller 452 driven by shaft 406. Peripheral portion 451 is cut down at 432 (Fig. 4C) to permit roller 452 to be out of contact with it when wheel 409 lies in its normal position as shown.

With these structural details in mind the operation of the selectable gear wheels will be considered, again using wheel 409 as an example.

Upon operation of magnet 426 (refer to Figs. 4 and 4C), wheel 409 is released by latch 425 and rotates sufficiently, due to force exerted by weighted sector 449, to cause starting segment 453 to mesh with pinion 405, proper seating of the teeth being assured due to action of the spring and plunger device shown in Fig. 4B and described above. Starting segment 453 and wheel 409 are now driven by pinion 405 which receives its motion directly from motor 400. As wheel 409 continues to rotate segment 453 meshes with pinion 404 driven from motor 400 through gears 401, 401B and 402. Segment 453 lies in a plane with a portion of shaft 408 not carrying a pinion as 407 (such as 461, Fig. 4A) and consequently imparts no motion to that shaft. As starting segment 453 leaves pinion 405, driving segment 450 comes into mesh with pinion 405 which continues to drive wheel 409 forward. Driving segment 450 lies in a plane with a portion of shaft 408 on which a pinion as 407 is mounted. Consequently, when segment 450 reaches pinion 407 the latter is driven forward an amount dependent on the number of teeth in the driving segment, carrying with it shaft 408 on which it is rigidly mounted. When driving segment 450 leaves pinion 405, starting segment 453 is then in engagement with pinion 404, and when the starting segment 453 leaves pinion 404 the driving segment 450 engages this pinion, as will be evident from Fig. 4C. Since the pinions 404 and 405 are elongated continuous pinions, as shown in Fig. 4A, the off-set relation between the starting segment 453 and driving segment 450 does not prevent the bridging of the pinions 404 and 405 by the two gear segments mentioned. Positive drive of the wheel 409 is thus assured during the entire time during which the driving segment is driving pinion 407. Meanwhile roller 452, mounted rigidly on shaft 406 driven through gears 401, 401A and 403 from motor 400, has come into frictional contact with rim surface 451 (Fig. 4C). When, therefore, driving segment 450 leaves pinion 404, wheel 409 continues to rotate under friction drive until stopped by latch 425 which has by this time returned to normal position due to release of magnet 426.

It follows therefore, that wheels 409–424 drive pinions as 407 and shaft 408 an amount dependent upon the number of gear teeth of their driving segments 450. Thus, by releasing different wheels in a manner later described, varying predetermined amounts of motion can be imparted to pinions as 407 and to shaft 408 driven by these pinions.

The various drive shafts as 472, 473, 474 of the money or credit balance registers (Fig. 8), stock price registers (Fig. 9) and cotton price registers (Fig. 10) also receive this motion through gears 462 and 463, shaft 464, and respective sets of gears 466 and 467, 468 and 469, 470 and 471. The various gear ratios are such that a single revolution of a price changing wheel will serve to change both the price on a price register by the correct amount and the readings of selected money registers by an amount equal to the profit or loss on one trading unit, resulting from the price change. Money registers associated with accounts containing more than one trading unit are correctly changed by causing the price changing wheel to revolve a number of times equal to the maximum number of trading units in any account. This feature is explained under the heading "Control relays".

Circuit changer

The switching device of Fig. 5 is utilized for extending circuits representative of the character of a trader's commitment to circuits representative of increase or decrease in credit balance according to the direction of price change. This is necessary since a trader's balance may be increased in either one of two ways—by a rise in price on a long commitment or a fall in price on a short commitment; or may be decreased in either one of two ways—by a rise in price on a short commitment or a fall in price on a long commitment. Since the money register control magnets, as 801 and 802 of register 800, are arranged to care for two conditions only, increase or decrease, it is seen that an increase produced in either one of the two ways mentioned above must cause the reading of the money register to be increased and that, similarly, a decrease produced in either of the ways mentioned must cause the reading of the money register to be decreased.

The switching device comprises a solenoid 500 (Fig. 5) the plunger 501 of which is linked to an arm 502 which is attached to an insulating pivoted bar 503 which lies beneath the middle contact springs as 505, 508 of a number of groups of contacts as 504, 505, 506; 507, 508, 509; etc. When solenoid 500 is operated, therefore, bar 503 which has a rectangular cross section, is tipped by arm 502 and acts as a cam to move all lever contacts as 505, 508 from the normal position in which they make contact with contact springs 506, 509, etc., to the upper position in which 505 makes contact with 504, 508 makes contact with 507, etc.

As hereinbefore set forth in the description of Fig. 3, each set of commitment jacks associated with a trader's account includes two vertical rows of contacts, one for establishing circuits representative of a long commitment and one for establishing circuits representative of a short commitment. Contacts as 310 (Fig. 3) representative of a long commitment are connected through conductor 320 to lever spring 505 of the circuit changer (Fig. 5), and contacts as 312 representative of a short commitment are connected through conductor 318 to lever spring 514. When the price change is upwards, the index arm 205 is moved to the left; consequently, as cam 207 rotates counter-clockwise contact spring 210 remains unoperated and contact 208 is opened. Accordingly, ground is not supplied to the winding of the solenoid 500, which remains unoperated. Therefore long contact 310 is connected through conductor 320, lever spring 505 and contact 506 to conductor 521 and a money register control magnet 802 used to register increase. If, however, the price change is downward, contact 310 will be connected through conductor 320, lever spring 505, contact 504 (since the solenoid 500 operates on a drop in price) due to the clockwise rotation of index arm 205 and cam 207 and conductor 520 to money register magnet 801 used to register decrease. Thus, an increase in price on a long transaction causes a money register increase magnet to be selected while a decrease in price on a long transaction causes a money register decrease magnet to be selected.

Also when the price change is upwards and solenoid 500 consequently inoperative, short contacts 312 are connected through conductor 318, lever spring 514, contact 515 and conductor 520' and 520 to money register decrease magnet 801. If the price change be downward, solenoid 500 operates and short contacts 312 are connected to money register increase magnet 802.

The circuit changer, then, causes a decrease on a short sale to have the same effect as an increase on a long sale and a decrease on a long sale to have the same effect as an increase on a short sale.

In a manner similar to that explained above for contacts 310 and 312 other long and short contacts are connected to either the increase or decrease magnets of their associated money registers, according to the direction of price change.

Figures 9, 10:
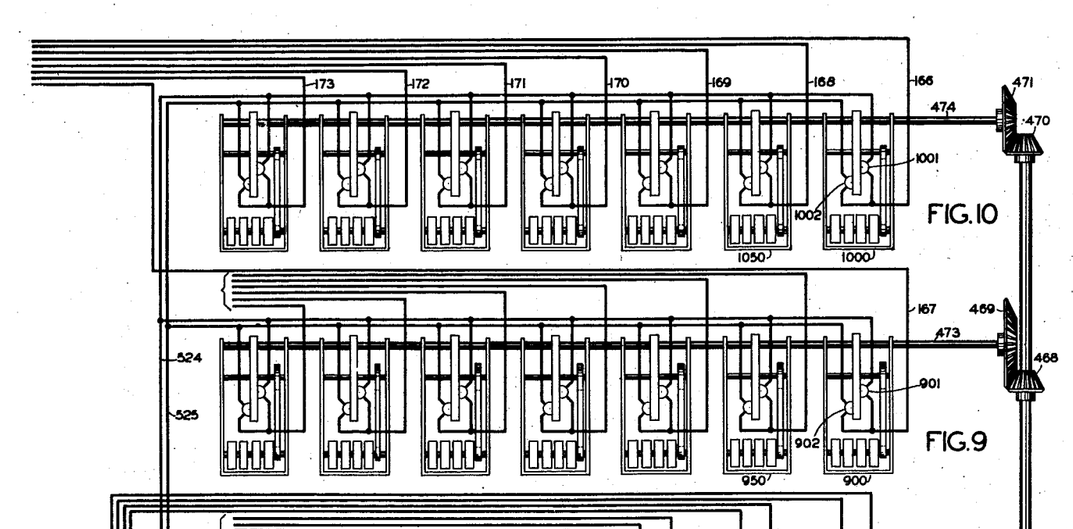
Fig. 9 is a plan of a group of stock price registers.
Fig. 10 is a plan of a group of cotton price registers.

It is also necessary that the price registers of Figs. 9 and 10 be oppositely affected by a price change up or down, which is accomplished by use of contact groups 530, 531, 532 similarly operated. These circuit arrangements will become more clear during the description of the operation of the board.

Control relays

The control relays shown in Fig. 6 are designed to control the number of revolutions to be made by a selected price changing wheel, in accordance with the maximum number of commodity units selected by the insertions of plugs in the commitment jack unit of Fig. 3. These relays also control the starting and stopping of the motor 400 which drives the shafting of Figs. 4, 8, 9 and 10. Likewise, they determine the length of time the selected registers are to be connected to the driving means in terms of a pre-determined number of revolutions of the price changing wheels. The operation of these control relays will be set forth in detail at the time when the operation of the system in registering definite traders' accounts is explained.

Initiating button and supervisory lamps

Fig. 7 shows the starting button 700 which initiates operation of the apparatus as well as two supervisory signal lamps 720 and 721. Starting button 700 is a simple push button having duplicate grounding contacts 701 and 702. Signal lamp 720 is for indicating the position of the commodity selector of Fig. 1 and the price selector of Fig. 2; lamp 721 is for indicating when a registration operation has been completed.

Credit balance or money registers

Figure 8A:
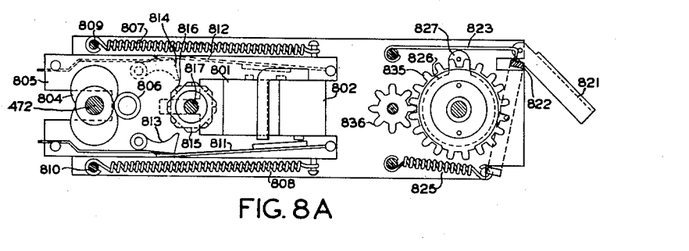
Fig. 8A is a side elevation of one of the money registers of Fig. 8.
Figure 8B:
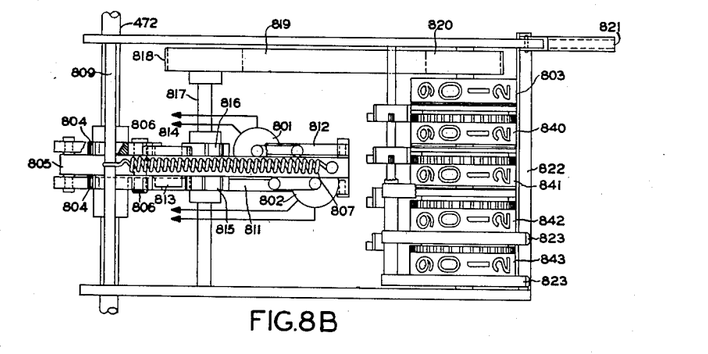
Fig. 8B is a plan of one of the money registers of Fig. 8.
Figure 8C:
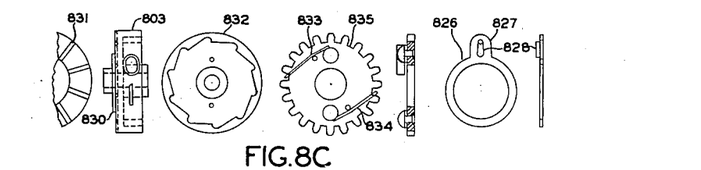
Fig. 8C is an exploded view of certain parts of one of the registers to show the construction of a warning signal.

Fig. 8 and the auxiliary detail views, Figs. 8A, 8B and 8C, show the credit balance or money registers one of which is associated with each trader's account. These registers are electrically controlled and shaft driven and register the balances of the various traders' accounts at all times. As was shown when the circuit changer of Fig. 5 was described, each register as 800 (Fig. 8) contains two magnets 801, 802 which are connected by conductors 520 and 521 respectively to circuit changing springs 504 and 515, 506 and 513 and thence to vertical rows of long and short commitment contacts in the traders' commitment jacks.

Fig. 8A is a side elevation in detail of a money register as 800; Fig. 8B is a plan of the same register; both of these views are on a larger scale than that of Fig. 8. In describing the money registers, reference will be made to money register 800 only, since all others are duplicates.

Money register 800 contains five register wheels 803, 840, 841, 842 and 843 each carrying numerals 1-9 and 0 on its periphery. Wheel 803 is the units wheel, wheel 840 the tens, 841 the hundreds, 842 the thousands and 843 the ten thousands wheel. Wheel 803 is driven from shaft 472 whenever register 800 is selected for operation. The other wheels are driven from wheel 803 through carry-over gears as 835 (Figs. 8B and C) and transfer pinions as 836 (Figs. 8A and B) in a manner well known in the art.

With this system all shafts as 472, (the number of such shafts needed depending on the size of the system) rotate on each operation and always in one direction. The register may be selected to increase or decrease the indications previously registered, whether increase or decrease occurs depending only on which of the two magnets 802 and 801 is selected.

Register 800 is actuated by a cam 804 which is shown in Figs. 8A and 8B to be a spool having its end portions shaped like a figure 8. This cam is fixed to rotate with shaft 472. As shaft 472 revolves slide bar 805 is moved forward and backward due to the action of cam 804 against cam rollers 806 which are fixed to the slide bar. Cam rollers 806 always remain in contact with cam 804 due to tension applied by springs 807 and 808 to move slide bar 805 to the rear. One end of spring 807 is attached to slide bar 805 and the other end to register frame brace 809. Spring 808 is similarly attached to slide bar 805 and to register frame brace 810.

Mounted on each slide bar as 805 are two magnets 801 and 802 arranged so that their extended armatures 811 and 812 operate pawls 813 and 814 respectively. Pawls 813 and 814 are also mounted on the slide bar, one pivoted on each side, and move forward and backward with each motion of the bar. Pawl 813 is arranged to engage ratchet wheel 815 whenever magnet 802 is energized, thus rotating shaft 817 in a counter clockwise direction during rotation of shaft 472. Gear 818 fixed to shaft 817 transfers this motion through chain 819 and gear 820 to register wheel 803 which consequently moves in a direction to increase its reading. In a similar manner pawl 814 engages ratchet 816 when magnet 801 is energized causing clockwise rotation of the register wheel 803 to reduce its reading, or more exactly, to reduce the composite reading of the register wheels.

The ratio between cam 804 and the driven register wheel 803 being 2 to 1, each half rotation of the cam shaft 472 causing a quarter revolution of the register wheel 803. Since each revolution of register wheel 803 represents $10, (each division being $1) each half of cam 804 represents a movement of $2.50 on register wheel 803. The ratio is made such in order to care for the fact that a one-point price change on a unit of trading (50 bales) of cotton is $5.00, and on a unit of trading of stock (100 shares) $12.50. $2.50 is, then, the highest common denominator and allows a common driving means for the register of a trader who may have commitments of both cotton and stock.

In a machine for cotton, stocks and grain, the multiplying steps would be in terms of $1.25 as a a one point price change in grain is $6.25; the highest common denominator of $6.25, $5.00 and $12.50 being $1.25.

Warning signal

It is of great importance for a broker to have advance notice of accounts nearing depletion, for which reason means are provided in each credit balance or money register settable to a predetermined point and arranged to operate a warning signal when that predetermined point is reached.

For this purpose each register wheel as 803 is fitted with an adjustable member as 826 (Fig. 8C) which forms a ring and is fitted to hub 830 of wheel 803. Member 826 carries an extension 827 in which a rib 828 is formed to engage slots as 831 for retaining member 826 in its adjusted position against movement of wheel 803.

Arm 827 of member 826 extends beyond the periphery of wheel 803 so that directly above and in its path is a latch arm as 823 (Figs. 8A and 8B) for the purpose of holding operating piece 822 retracted until all extensions as 827 engage their respective latch arms. When this occurs spring 825 causes the upper end of operating piece 822 to move outward and force semaphore 821 into the position shown in the drawings.

From the foregoing it will be seen that if the broker wishes to be warned when an account reaches, say, $1000, the adjustable members 826 will be set at a point midway between 8 and 9 for the 1 and midway between 7 and 8 for the 000's. The setting is displaced 90 degrees from the numbers desired because the latch arms as 823 are at the top of the register wheels, whereas the reading is taken at the front. When, therefore, the composite reading of the several register wheels is $1000 the several members raise their latches freeing piece 822, the upper end of which is moved forward by spring 825, thus raising semaphore 821.

Register setting

Money is quite frequently withdrawn from or deposited in margin accounts. In order to permit such sums to be added to or subtracted from the readings of the money registers without beginning at the wheel of the lowest order and carrying the operation through the whole series, the register wheels are of special design. At 832 (Fig. 8C) is shown the interior of a register wheel with carry-over gear 835 removed. Its internal periphery is cut in the form of a ratchet gear having one tooth for each numeral appearing on the face of the wheel. These teeth engage springs 833 and 834 of carry-over gear 835. Thus, as motion is transmitted from the lower to the higher order of register wheels through the carry-over gears as 835 and adjacent transfer pinions as 836 (Fig. 8B), the springs serve as couplings between the gears and the register wheels. Although the springs are sufficiently strong to couple the carry-over gears and register wheels during normal operation, it is possible to move any wheel in respect to any other by manually holding one and turning the other. Thus, any register wheel may be moved indepedently of others and new sums easily added to or substracted from the register readings.

Stock price registers

Fig. 9 shows a register group for indicating changes in stock price composed of registers similar to those of Fig. 8 but differing slightly in gear ratios between the various shafts, and having but four register wheels, fractions, units, tens and hundreds. The ratio between the sub shaft 464 and the register drive shaft 473 is two and one-half to one; the ratio between the ratchet shaft (similar to 817, Fig. 8B) and the units register wheel is two to one; the ratio between the drive shaft 473 and the ratchet shaft is 4 to 1 since each revolution of the drive shafts moves the slide bar forward and backward twice, moving the ratchet 2 teeth out of the total of 8.

The ratio between sub shaft 464 and the units register wheels of the stock price registers is, then, $$\frac{2.5}{1} \times \frac{4}{1} \times \frac{2}{1} \text{ or } \frac{20}{1}$$

Now as was shown when Fig. 4 was discussed, the price changing wheel for a one-eighth point price change in stock has a driving gear segment of twenty teeth; consequently a one-eighth price change will cause shaft 408, which is driven by a pinion as 407, and sub shaft 464 to rotate $$\frac{20}{8}$$

or 2.5 turns. Two and a half turns of shaft 464 cause the units register wheel to rotate $$2.5 \times \frac{1}{20}$$

or one-eighth turn, altering its reading by one-eighth corresponding to the price change.

Cotton price registers

Fig. 10 shows the price registers which register the prices of the various deliveries of cotton. They operate in unison with the money registers but register the price only. For example, if May cotton stands at 15.28 and advances one point the reading on the price register is changed to 15.29. The common drive shaft 474 of the several cotton price registers is driven from the main shaft 408 through a pair of bevel gears 470 and 471 having a one to two ratio. Shaft 408 revolves once for each point change in price of cotton, hence shaft 474 revolves one-half a revolution. Since the ratchet wheels of the cotton price registers (which are similar to the money register ratchets) have ten teeth each, one-half revolution of shaft 474 moves shaft as 817 (Fig. 8A) one-tenth of a revolution. In the cotton price registers the ratio between gears as 818 and 820 is 1 to 1, consequently for each revolution of shaft 408 the register wheel as 803 will move one-tenth of a revolution corresponding to the decimal units in which cotton is quoted.

The foregoing description covers the mechanical elements of the board. The following material will give, by illustrative example, the electrical circuits and complete operation of the board including the price posting of quotations for either stocks or commodities as well as the margin calculating features.

In considering the operation of the invention two traders' accounts will be carried through sufficient alterations to show the circuits and the operation of the various devices.

Assume that the commitments of two traders in two commodities are as follows:

Trader X—Commodity A (May cotton), 6 units
(300 bales) short
Commodity B (I. T. T. stock), 2 units
(200 shares) long
Trader Y—Commodity A (May cotton), 3 units
(150 bales) long Trader X's account is such that his margin will be depleted below a safe limit when $1000 remains in his account, while Trader Y's account will have sufficient margin until it is down to $500.

Trader X's balance at the present time is $1100 and Trader Y's present balance is $750. May cotton stands at 16.24 while I. T. T. stock is at 61.

In Fig. 3 the uppermost row of jacks represents commodity A and the second row represents commodity B. Also the left hand row is representative of Trader X's account and the second row from the left is representative of Trader Y's account.

In order to represent the commitments of Trader X and to establish circuits corresponding thereto, a short plug for six trading units 315 (Fig. 3F) is inserted in the upper left hand jack, showing that Trader X's account includes a short sale of six units of commodity A; and a long plug for two trading units 316 is inserted in the jack second from the top of the left hand row, showing that Trader X's account also includes a purchase of two units of commodity B.

In order to represent the commitments of Trader Y and to establish corresponding circuits, a long plug for three trading units 314 is inserted in the uppermost jack of the second row from the left showing Trader Y's account to include a purchase of three units of commodity A.

Since Trader X's balance is now $1100 the wheels of money register 800 associated with his account are adjusted manually as explained under "Register setting" to indicate that sum. The warning means is also set to function when the reading is reduced to $1000, in the manner indicated under the section entitled "Warning signal."

Similarly, money register 850 associated with Trader Y's account is set to read $750 and the warning signal is set to operate at $500.

Circuits are now established so that any price change in either one of the commodities considered will affect one or both of the traders' balances, as will appear hereinafter.

Assume that at this time the price of May cotton (commodity A) changes from 16.24 to 16.25. Index handle 126 of the commodity selector (Fig. 1) is now adjusted to the designation corresponding to May cotton causing wipers 113—123 to make contact with contacts 101—111 respectively. Price changing lever 205 (Fig. 2) is moved to the left to the position designated as a one point price change in cotton which causes wiper 203 to make connection with contact 201.

Due to the off-normal positions of the commodity and price selector index arms, contacts 210 (Fig. 2) are closed under action of cam 209 and contacts 130 and 131 (Fig. 1) are closed under action of cam 128. Ground is then applied over contacts 210, conductor 133, contacts 130 and 131, and conductor 134 to the armature associated with contact B of relay 600. Since relay 600 is inoperative this ground is not effective at this time.

A circuit is also established from contact B of relay 614 (Fig. 6) through conductor 142, wiper 116 and contact 104 of the commodity selector (Fig. 1); conductor 158; contact strip 302; studs and body of plug 314; long contact 311 of the commitment jack unit; conductor 319; lever 508 and contact spring 509 of the circuit changer (Fig. 5); and conductor 523 to magnet 852 of money register 850 (associated with Trader Y's account). No current flows in this circuit as yet since, although it is closed through to ground at magnet 852, it remains open at contact B of relay 614.

A similar circuit is established at this time from contact B of relay 620 (Fig. 6) through: conductor 139; wiper 119 and contact 107 of the commodity selector (Fig. 1); conductor 161; contact strip 305, contact studs and body of plug 315 and short contact spring 312 of the commitment jacks; conductor 318; lever 514 and contact spring 515 of the circuit changer (Fig. 5); and conductor 520 to decrease magnet 801 of money register 800 (associated with Trader X's account) and to ground.

There is also established a circuit from contacts B of relay 610 through conductor 145; wiper 113 and contact 101 of the commodity selector (Fig. 1); and conductor 166 to the left hand or increase magnet 1002 of cotton price register 1000 (Fig. 10); conductor 525; contact spring 532 and lever spring 531 of the circuit changer (Fig. 5) to ground.

The three registers 800, 850, 1000 are the only ones which can subsequently operate since all other register circuits are open either at the commodity selector or at the commitment jacks.

Now the initiating button 700 (Fig. 7) is depressed. This places ground on conductors 710 and 711. The ground applied over conductor 710 causes relay 600 to operate while ground on conductor 711 causes relays 602 and 605 to operate and also extends ground to contact A of relay 603 without effect, however, since that contact is already grounded.

Relay 600 locks up through contacts A due to the ground on these contacts from contact 210 of the price selector as already explained. Battery is also applied over contacts B of relay 600 and conductor 713 to lamp 720 (Fig. 7) which, however, does not light due to the open contacts at B of relay 605 which has now operated.

Operation of relay 602 applies battery over contacts A of that relay and conductor 651 to price changing wheel control magnet 426 (Fig. 4) and thence over conductor 211, contact 201 and wiper 203 of the price selector (Fig. 2) and conductor 227 to a ground at contact A of relay 605 which is in its operated position.

The operation of relay 605 and consequent placing of ground on conductor 227 also causes relay 604 to operate since a path is completed for current flow from battery through the winding of relay 604 to the now grounded conductor 227. Also the operation of relay 605 causes contacts C to close for a purpose described below.

Energization of relay 604 extends ground from its contacts A to bus conductor 659. Ground is then applied over contacts C of relay 605 to contacts A of relay 606 but without effect since contacts A are open, relay 606 being yet unoperated. Ground is also extended over bus conductor 659 and thence through the winding of relay 607 to battery; through the winding of relay 608 to battery; over contacts B of relay 609 and through the left hand winding of relay 610 to battery; over contacts B of relay 611 and through the left hand winding of relay 612 to battery; over contacts B of relay 613 and left hand winding of relay 614 to battery; and over similar paths to battery through the left hand windings of relays 616, 618, 620, 622, 624, 626, and 628. Relays 607, 608, 610, 612, 614, 616, 618, 620, 622, 624, 626 and 628 all operate.

Operation of relays 607 and 608 closes a circuit to motor 400 (Fig. 4); ground being applied to the motor over contacts A of relay 608 and battery over contacts A of relay 607.

Operation of relay 610 completes a circuit from battery through the winding of relay 601, conductor 660, contacts B of relay 610 and over a path already described through the commodity selector and increase magnet 1002 of cotton price register 1000 (Fig. 10) and contacts 531 and 530 of the circuit changer to ground. Relay 601 and magnet 1002 operate due to the completion of this circuit. Likewise operation of relay 614 completes a circuit through the winding of relay 601, conductor 660, contact B of relay 614 and a path already described through the commodity selector, commitment jacks, circuit changers and increase magnet 852 of money register 850 to ground. Thus, money register 850 is arranged to respond to motion of shaft 472. A third circuit is established through contacts B of relay 620 and a path already described to energize decrease magnet 801 of money register 800, thus arranging that register to respond to motion of shaft 472.

Price register 1000 is now arranged to increase its reading, money register 850 to increase its reading, and money register 800 to decrease its reading.

Operation of relay 601 applies ground over its contacts A to the winding of relay 603, which then operates. Closure of contacts A of relay 603 applies ground to conductor 711 to substitute for ground from the initiating push button 700 (Fig. 7). The push button may now be released; although the description of the operation of the relays up to this point is quite long, the actual relay operation is practically instantaneous and the initiating button need be depressed only momentarily. Closure of contacts B of relay 603 applies ground to conductor 227 for a purpose later described.

Battery and ground were applied to motor 400 when relays 607 and 608 operated. Since latch 425 had already been pulled up under action of magnet 426, wheel 409 was free and immediately started to revolve, being driven by the starting segment 453 (Fig. 4C).

Now the driving teeth 450 reach the pinion 407 and drive it and shafts 408 and subshafts 464, 472, 473 and 474 forward. Revolution of shaft 464 carries with it jockey roller 465. Contacts 670 alternately open and close applying a pulsating ground to conductor 655 and slow release relay 606. The first closure of ground causes relay 606 to operate; due to its slow release characteristics it remains closed during the continuation of the pulsating ground.

Closure of contacts A of relay 606 closes ground through from conductor 659 and contacts C of relay 605 to bus conductor 661, while closure of contacts B of relay 606 applies ground to bus conductor 656. Ground over conductor 656 causes relays 610, 612, 614, 616, 618, 620, 624, 626, 628 already operated as described, to lock through their right hand windings. Also ground over conductor 661 causes relay 609 to operate. Relay 609 then locks over its locking contacts A to grounded bus conductor 659. This condition obtains until driving gear segment 453 has completely disengaged from pinion 407.

When the driving gear segment has left pinion 407, shaft 408 ceases to revolve. Since driving gear segment 453 has eight teeth and pinion 407 has also eight teeth, shaft 408 will have made one complete revolution and, due to the gear and ratchet ratios previously explained, price register 1000 will now read 16.25, money register 850 will read $505 ($500+$5) and money register 800 will read $1095 ($1100−$5).

Also as soon as shafts 408 and 464 cease to rotate so does jockey roller 465. Contacts 670 now open for sufficient time to release relay 606, which release removes ground from conductors 656 and 661.

The left hand winding of relay 610 is open due to the locked condition of relay 609; the right hand winding is also open due to removal of ground from conductor 656. Consequently the circuit from contact B of relay 610 to magnet 1002 of price register 1000 is opened; magnet 1002 releases and no further registration can take place on that register. However, relay 601 remains operated in spite of the opening of one of its parallel branch circuits at contacts B of relay 610, since the other parallel branches through contacts B of relays 614 and 620 remain closed. It is also to be noted that relays as 612, 614, etc. remain operated due to circuits through their left hand windings and contacts B of respectively associated relays 611, 613, etc.

Now the carry-over roller 452 has returned wheel 409 to the starting position and starting segment 453 has again brought driving gear segment 450 in mesh with pinion 407. Shaft 408 and all sub-shafts again start to revolve. Jockey roller 465 and contacts 670 again apply pulsating ground to conductor 655. Relay 606 is again energized. Ground is applied from contact A of relay 606 over conductor 661 and left hand winding of relay 611 to contacts D of relay 610. There is then a current flow through conductor 660, left hand winding relay 611, contact D of relay 610 to grounded conductor 661. Relay 611 operates and locks to bus 659 through its locking contacts A and right hand winding. Also relays 612, 614, 616, etc. again lock to bus 656.

At the end of this period of rotation of shaft 408 money register 850 reads $510 and money register 800 reads $1090.

Release of relay 606 upon cessation of rotation of shaft 408 again removes ground from bus conductors 656 and 661. Relay 612 falls open without effect since no register circuits were completed through its contacts B. Shaft 408 again commences to revolve; relay 613 operates and locks due to ground on conductors 659 and 661.

At the end of this (the third) period of revolution money register 850 reads $515 and money register 800, $1085.

Relay 606 again releases in turn releasing relay 614. This opens the circuit to money register 850 at contacts B of relay 614 and no further registration is possible on that register. Relay 601 now continues operative due to the path through contacts B of relay 620.

Shaft 408 again commences to revolve and relay 615 operates and locks. At the end of this (the fourth) revolution register 800 reads $1080. Upon release of relay 606 relay 616 releases without effect on a register.

During the next (the fifth) revolution relay 617 locks and at the end of the revolution relay 618 releases; the register reading now being $1075.

Upon the commencement of the sixth revolution relay 619 operates and locks. At the end of the revolution relay 620 releases, the money register now standing as $1070.

When relay 620 opens, the only remaining path for battery through relay 601, that through contact B of relay 620, is opened; consequently relay 601 falls open. This removes battery from the winding of relay 603 which releases removing ground from relays 602, 604, 605. Release of relay 602 removes battery from magnet 426 (Fig. 4) and allows latch 425 to restore to normal position, thus engaging and restoring wheel 409 to normal position when the carry-over roller returns it.

Release of relay 604 removes ground from bus conductor 659 and releases all relays 609—628 and also 607 and 608 stopping motor 400.

Release of relay 605 completes a circuit through its contacts B, conductor 652, lamp 720 (Fig. 7), conductor 713 and contacts B of relay 600. The lamp lights indicating completion of the registration and remains lighted until the commodity selector is restored to normal or the price selector is restored to normal, breaking the locking circuit of relay 600 at either contacts 130, 131 or contacts 210.

When the commodity selector is restored to normal but the price selector is not, the lamp 721 lights due to a circuit from ground through contacts 210 (Fig. 2), conductor 133, contacts 130, 131, conductor 132 and the lamp to ground. Thus, the extinction of both lamps shows that both selectors have been returned to normal.

This cycle of operation completes the price posting and computation of balances brought about thereby for all traders whose accounts include commodity A (May cotton).

Meanwhile the price of commodity B (I. T. T. stock) has fallen from 61 to 60½. Commodity B is one of the commodities shown by the plugs inserted in the commitment jacks to be included amount the accounts. Therefore, the price change will alter the balance of Trader X since he has 200 shares thereof on long commitment.

Commodity selector index arm 126 (Fig. 1) is now moved to the designation for commodity B bringing the wipers 113—123 into contact with the second vertical row of contacts (the only contact of this row which is visible in the drawings is 112) and the price change selector (Fig. 2) is moved to the right to the designation "½ stock" since the price change is from 61 to 60½ or −½ point.

When the index arm is moved to the right cams 207 and 209 cause contacts 208 and 210 respectively to close. A circuit is established from battery through winding of solenoid 500 (Fig. 5), conductor 229 and contacts 208 to ground. Solenoid 500 operates moving lever springs as 505, 508 from their lower contact springs 506, 509 to upper springs 504, 507.

A circuit is also established over contacts 210, conductor 133, contacts 130 and 131, and conductor 134 to contacts A of relay 600. This is ineffective since at this time relay 600 is inoperative. Another circuit is prepared from contact B of relay 612 over conductor 143, wiper 115 of the commodity selector (Fig. 1), a contact of the commodity selector similar to 114 but in the next vertical row (not visible), conductor 147, contact strip 321 (Fig. 3), contact studs and body of plug 316, long contact 331, conductor 320, lever spring 505 (Fig. 5), contact spring 504, conductor 520, decrease magnet 801 of money register 800 (Fig. 8) to ground. No current flows over this circuit at this time since contacts B of relay 612 are open.

As explained when the cycle of operation of the board during the posting of information based on commodity A was described, circuits are also prepared from contacts B of relay 610 (Fig. 6) to stock price register 900 and from contacts A of the relay 602 through conductor 227, wiper 203 (Fig. 2), contact 230 and conductor 222 to price changing wheel magnet 476 (Fig. 4).

These circuits having been prepared by operation of the commodity and price selector, the initiating button 700 (Fig. 7) is now depressed resulting in operation of relays 600—608 and 610, 612, 614, 616, 618, 620, 622, 624, 626, 628. Since the manner of operation of these relays has previously been described in detail it is not repeated here.

Upon operation of relays 607 and 608 motor 400 (Fig. 4) starts to rotate, driving price changing wheel 420 through pinion 405 and the starting gear segment. Finally the driving gear segment comes into mesh with a pinion as 407 and shaft 408 commences to revolve. The driving gear segment of wheel 420 has 80 teeth, consequently during each revolution of wheel 420, pinion 407 revolves ten times. As was explained previously, each revolution of shaft 472 advances or retracts operated money register 800 by a $5 amount. Consequently, at the end of the first revolution of price changing wheel 420 register 800 shows $1070—50 or $1020. Meanwhile upon the commencement of rotation of shaft 408 and the subshafting, jockey roller 465 has caused a pulsating ground to be extended to relay 606, as before, causing that relay to operate and through it causing relays 609 to operate and lock. At the end of the ten revolutions of shaft 408, relay 606 is released and relay 610 also releases as described previously. This opens contacts B of relay 610 and disconnects price register magnet 901, the register 900 now reading 60½.

The carry-over roller brings the starting gear segment again in mesh and shortly thereafter shaft 408 again starts to revolve, causing, indirectly, relay 611 to operate and lock and relays 612, 614, etc. to lock. At the end of this revolution relay 612 releases and opens the only remaining path for current through winding of relay 601. Consequently all relays 601—628 become deenergized, the motor stops and lamp 720 lights, indicating that the registration operation is complete. Money register 800 now stands at $1020—50 or $970. The commodity selector is then returned to zero position by the operator, relay 600 releases and extinguishes lamp 720 at the same time causing lamp 721 to light, indicating that the price selector is still in its off normal position. The operator restores the price selector.

The adjustable members as 826 (Figs. 8B, 8C) of money register 800 were set to operate semaphore 821 when the money register reading should be $1000. At the beginning of the computation based on a price change in commodity B, register 800 read $1070. As explained when the registers were described, each revolution of shaft 473 changes the reading by $5.00; therefore at the fourteenth revolution of shaft 473 (which occurs during the second revolution of price changing wheel 420) members as 826 lift latch arms as 823 freeing operating piece 822 and raising semaphore 821 to indicate that the account of Trader X has been depleted below the previously determined safe limit.

The foregoing examples show how prices are registered on the price registering dials and how balances are computed and registered on the money or credit-balance registers in accordance with the amount and direction of the price change and the amount and character of the traders' commitments. These examples also show that the reading may be varied either upwards or downwards, while the shafts driving the registers rotate in one direction only, and that the direction of alteration of the balances is dependent only on the selection of an increase or decrease magnet. Also these examples show that the balances of all traders having commitments in a stock are effected simultaneously and that the price changing wheels are selected in accordance with the price change, while the number of revolutions made by any selected price changing wheel is determined by the maximum commitment of the item considered in any account.

In addition the illustrative examples together with the description of the figures show how a semaphore signal may be set to operate when an associated money register reaches a reading indicative of an unsafe condition and how that semaphore operates when the predetermined point is reached.

It is to be noted that the position, number and kind of plugs inserted in the commitment jacks give the observer an indication of the total amount of any one stock or commodity in the various accounts and thus keep a broker from becoming too heavily burdened with any stock or commodity.

The above disclosure has been given by way of preference for purposes of description only. Therefore no unnecessary limitations should be understood and the appended claims should be construed as broadly as the state of the art permits.

What is claimed is:

1. In an apparatus of the class described, in combination, a set of registers for indicating credit balances, each register being adapted to indicate the balance for a particular account, each account having a plurality of units, means for selecting one or more of said credit balance registers, common driving means for all of said registers, and means for coupling each of the selected credit balance registers to said common driving means to effect a credit balance change proportional to the product of the number of units in the account associated therewith and a price change.

2. In an apparatus of the class described, a set of registers for indicating credit balances, each of said registers being adapted to indicate the balance on a particular account, means for selecting one or more of said credit balance registers for operation either forwardly or backwardly, unidirectionally driven common driving means for all of said registers, and means for coupling each of the selected credit balance registers to said common driving means to effect a credit balance change proportional to the product of the number of units in the associated account and a price change.

3. In an apparatus of the class described, sets of credit balance registers, means for selecting a register in a particular set, common driving means for said registers, gear wheels for variably operating said common driving means, and a selector for selecting a particular gear wheel to effect the rotation of the selected register for a period proportional to the alteration to be made thereon.

4. In an apparatus of the class described, a set of credit balance registers, settable means for selecting one of said registers, common driving means for said registers, relay controlled means for coupling said selected register to said common driving means for a period proportional to the alteration to be effected in said register, gear wheels for variably operating said common driving means, and a selector for selecting one of said gear wheels and for determining the direction of the alteration of said register.

5. In an apparatus of the class described, in combination, a set of registers for indicating credit balances, increase and decrease magnet circuits associated with each of said registers, means for selecting a number of registers, means for selecting one of said circuits for each register, common driving means for all of said registers operating in one direction only, and means for operatively associating said selected registers with said common driving means for operation to a higher or lower value in accordance with the circuit selected.

6. In an apparatus of the class described, in combination, a plurality of circuits, each representative of a commodity and the quantity thereof, each such circuit terminating on multipled contacts, a plurality of circuits each representative of an account and the character of a transaction, each such circuit terminating on multipled contacts, and contact connecting means to combine any one of said first mentioned commodity-quantity circuits with any one of said second-mentioned circuits to form a plurality of circuits each representative of an account, a commodity included therein, the amount thereof, and the character of the transaction.

7. In an apparatus of the class described, in combination, means for establishing a plurality of circuits, each representative of an account, the commodity or commodities included therein, the amount of each commodity, and the character of the transaction in each commodity, a plurality of credit balance registers, each common to the several commodity circuits contained in one of said accounts, means for selecting from the circuits common to any register a circuit representative of a particular commodity, and means for changing the registration of each of said registers in accordance with the amount and character of the transaction represented by the selected circuit associated therewith.

8. In an apparatus of the class described, in combination, traders' commitment jacks in the contacts of which terminate, circuits representative of commodity and quantity, and circuits representative of the account and character of the transaction in a commodity, plugs insertable in said jacks to combine said circuits into a plurality of circuits representative of the account, the commodity, the quantity of said commodity, and the character of the transaction in said commodity, a commodity selector settable to select all of said circuits representing the same commodity, a plurality of credit balance registers each having increase and decrease magnet circuits associated therewith, and means for extending each of the last mentioned circuits to either the increase or decrease magnet circuits of one of said registers in accordance with the nature of the transaction and the direction of price change in the commodity selector.

9. In an apparatus of the class described, in combination, commitment jacks, plugs insertable in said jacks to establish a plurality of circuits each representative of a transaction including the commodity and the quantity thereof (in trading units) involved, the account affected and the character of the transaction, a commodity selector settable to select a group of circuits representative of transactions in the same commodity, a plurality of credit balance registers, each having increase and decrease magnet circuits associated therewith, means for extending said selected group of established circuits to either the increase or decrease magnet circuit of the associated register in accordance with the character of the transaction, a price selector, common driving means for all of said balance registers, price changing wheels selectable in accordance with the setting of said price selector, each of said wheels having an effective driving portion to drive said common driving means a definite amount on each revolution, means governed by said transaction circuits to permit said selected price changing wheel to revolve a number of times equal to the maximum number of units of trading represented by any of the selected transaction circuits, means operable in accordance with the direction of operation of said price selector to interchange the increase and decrease magnet circuits when the price change be downward, and means for breaking any such selected increase or decrease magnet circuit and disconnecting the associated credit balance register from the common driving means when the reading of said register has been altered in accordance with the character of the transaction, the quantity of the commodity selected involved and the extent and direction of the change in price of that commodity.

10. In a device of the class described, in combination, a plurality of wheels each provided with a starting and a driving segment, means for driving any of said wheels, means adapted to be driven by the driving segment of any wheel, and selectable means for causing the starting and driving segments on a predetermined wheel to be brought into operative relation with said wheel driving means.

11. In a machine of the class described, credit balance registers, common driving means for said registers, a motor, means for transmitting motion from said motor to said common driving means, and means for starting said motor at the initiation of registration on said registers, and for stopping said motor only when the one of said registers undergoing the maximum change has been completely operated.

12. In a device of the class described, a plurality of circuits representative of a commodity and the quantity thereof, multipled contacts on which said circuits terminate, a plurality of circuits representative of the account and of the character of a transaction, a second group of multipled contacts on which said circuits terminate, mountings in which said first and second contact groups are so disposed in relation to each other as to comprise a number of jacks, each including a number of contacts, and plugs insertable in said jacks to combine any one of said plurality of circuits representative of commodity and quantity with any one of said circuits representative of account and the character of transaction in order to set up a circuit jointly representative of account commodity, quantity and the character of the transaction in said commodity.

13. In an apparatus of the class described, a set of registers for indicating credit balances, each of said credit balance registers indicating the balance for a particular account, means for selecting one or more of said credit balance registers, means for simultaneously initiating the operation of all selected registers, and means for discontinuing the operation of each of the selected credit balance registers after its operation in accordance with both a number of units contained in an associated account and the price change.

14. In an accounting system, a first group of circuits each representing an account, a commodity therein, and an amount of said commodity, a second group of circuits each representing an account, a commodity therein, and a type of transaction in said commodity, means for combining circuits in each group to form circuits each representing an account, a commodity, an amount of said commodity and a type of transaction therein, a register for each account, common driving means for the account registers, price changing means for variably operating said common driving means in accordance with a price change in any commodity, means for simultaneously associating with said common driving means each of the registers for accounts having combined circuits representing the same commodity, and control relay means co-operating with the combined circuits representing said commodity in the different accounts for retaining said registers in association with said common driving means until the registration of each register is changed in accordance with, jointly, the amount of said commodity represented by the combined circuit for said account and the price change on said commodity.

15. In an accounting system, a first group of circuits each representing an account, a commodity therein, and an amount of said commodity, a second group of circuits each representing an account, a commodity therein and a type of transaction in said commodity, means for combining circuits in each group to form circuits each representing an account, a commodity, an amount of said commodity and a type of transaction therein, a register for each account, common driving means for the account registers, price changing means for variably operating said common driving means in accordance with a price change in any commodity, means for simultaneously associating with said common driving means each of the registers for accounts having combined circuits representing the same commodity, and means in each register for causing said common driving means to advance or turn said register back in accordance with, jointly, the type of transaction as indicated by the combined circuit for the corresponding account and the direction of the price change on said commodity.

16. In an accounting system, a first group of circuits each representing an account, a commodity therein and an amount of said commodity, a second group of circuits each representing an account, a commodity therein and a type of transaction in said commodity, means for combining circuits in each group to form circuits each representing an account, a commodity, an amount of said commodity and a type of transaction therein, a register for each account, common driving means for the account registers, a plurality of price changing wheels, price selecting means operable in accordance with a price change in any commodity for operatively associating a selected price changing wheel with said common driving means, means for simultaneously associating with said common driving means each of the registers for accounts having combined circuits representing the same commodity, and control relay means co-operating with the combined circuits for retaining each register in association with said common driving means for a period determined by the amount represented by the combined circuit for the corresponding account, and for retaining said price changing wheel in association with said common driving means for a period determined by the maximum amount represented by the combined circuits relating to the same commodity.

17. In an accounting system, a first group of circuits each representing an account, a commodity therein and an amount of said commodity, a second group of circuits each representing an account, a commodity therein and a type of transaction in said commodity, means for combining circuits in each group to form circuits each representing an account, a commodity, an amount of said commodity and a type of transactions therein, a register for each account, common driving means for the account registers, and control relays co-operating with the combined circuits representing the same commodity for causing the actuation of said common driving means for a period determined by the maximum amount of the commodity in the combined circuits representing the same commodity.

18. In an apparatus of the class described, a plurality of credit balance registers, each adapted to indicate the balance on a particular account, each account having a plurality of units, means for selecting one of said registers, driving means for operating said selected register, selectable means for operating said driving means, and means for operatively associating said register with said driving means until said selectable means has completed one revolution for each unit contained in the account associated with said register.

CLYDE SMITH.